(No Model.) 2 Sheets—Sheet 1.
H. CULLEN.
MILK DELIVERY BOX.
No. 562,585. Patented June 23, 1896.
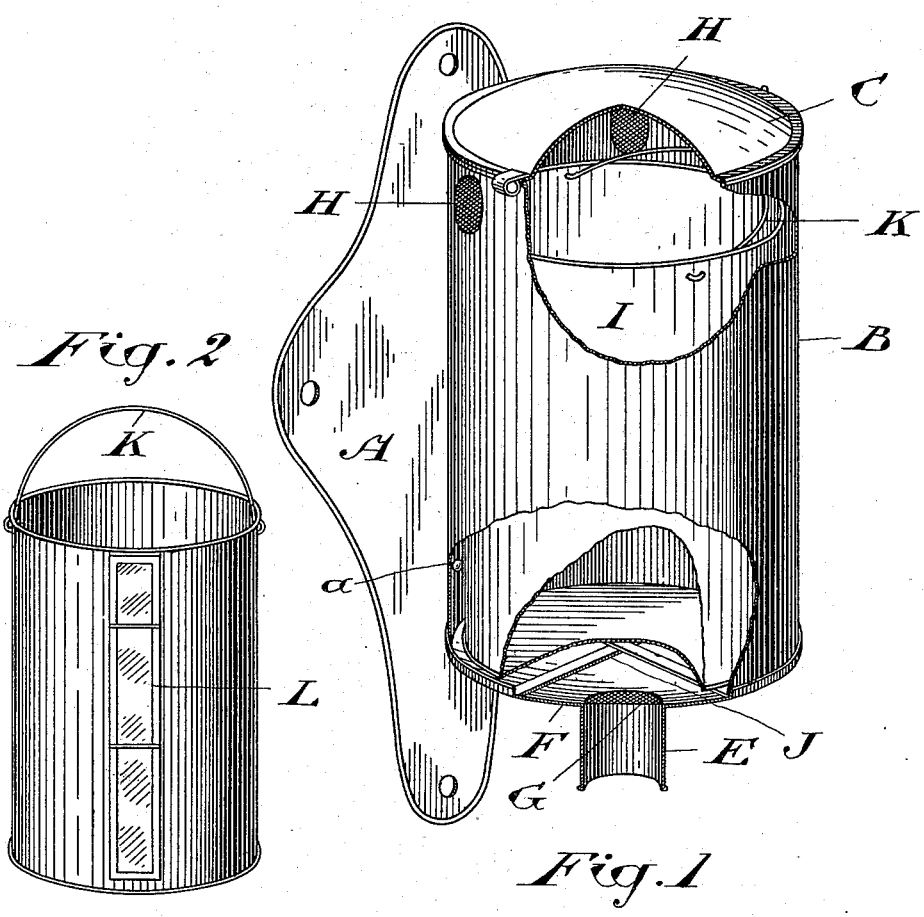
Witnesses
Fred Clarke
H. G. McMillan
Inventor
Harry Cullen
by
Ridout & Maybee
Attys

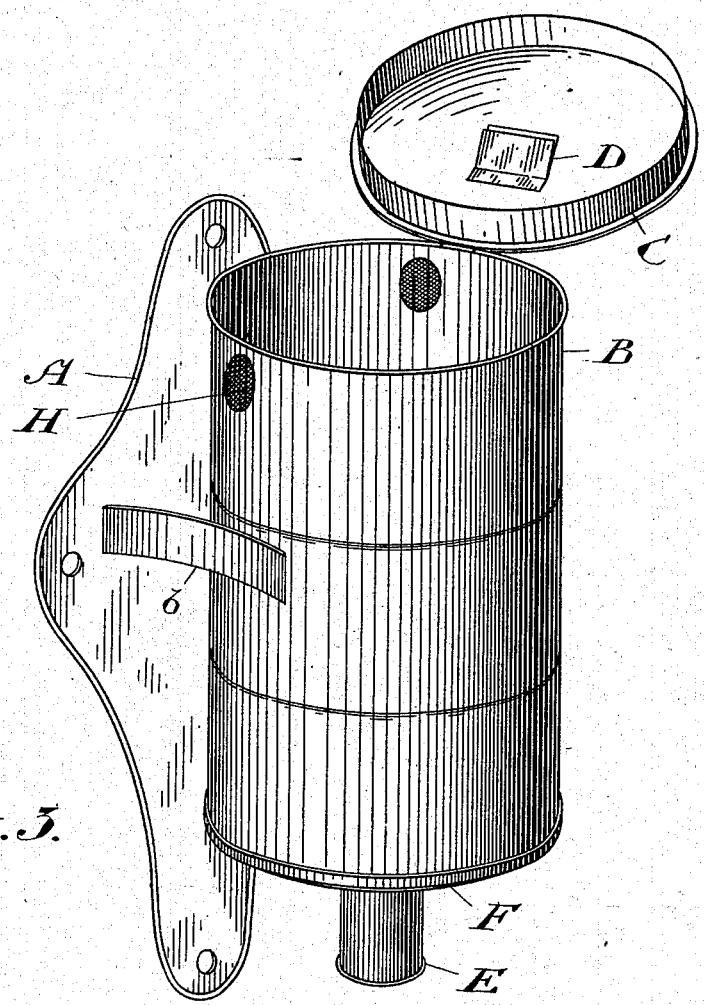

United States Patent Office.

HARRY CULLEN, OF TORONTO, CANADA, ASSIGNOR OF ONE-HALF TO FRANK READ, OF SAME PLACE.

MILK-DELIVERY BOX.

SPECIFICATION forming part of Letters Patent No. 562,585, dated June 23, 1896.

Application filed August 5, 1895. Serial No. 558,347. (No model.)

*To all whom it may concern:*

Be it known that I, HARRY CULLEN, of the city of Toronto, in the county of York and Province of Ontario, Canada, have invented a certain new and Improved Milk-Delivery Box, of which the following is a specification.

The object of my invention is to devise a simple and convenient receptacle for milk, in which the milkman going his rounds may deposit a supply of milk of the quantity or value represented by a ticket or order left within the receptacle; and it consists, essentially, of a plate or base to which is connected a case or box provided with a water-tight lid and adapted to contain a milk-can, a suitable drainage-spout, ticket-holder, and ventilators being provided, substantially as hereinafter more particularly described.

Figure 1 is a perspective view of the box, partly broken away to show the interior construction. Fig. 2 is a perspective detail, on a smaller scale, of the milk-can. Fig. 3 is a perspective detail of the box with the lid open to expose the ticket-holder.

In the drawings like letters of reference indicate corresponding parts in the different figures.

A is a sheet-metal plate provided with holes, so that it may be attached to a wall or door-post by means of screws or nails.

B is a case or box, preferably of japanned tin-plate, riveted or otherwise secured to the plate A, one of the rivets being shown at *a* in Fig. 1. Braces *b* are also preferably used to strengthen the connection between the box and the plate A. (See Fig. 3.)

C is the box-lid, which is preferably hinged and may, if necessary, be provided with a hasp and lock.

Within the lid is a ticket-receptacle D, formed of two contiguous spring-plates, between which the ticket is inserted.

E is a drainage-spout connected to the center of the convex bottom F. The spout is preferably guarded by a piece of wire-gauze G, to prevent flies or insects entering the box.

H are ventilator-holes located one on each side of the box, preferably in the position shown. These holes are also covered with wire-gauze to keep out flies and insects.

I is the milk-can, which preferably rests on the cross-bars J, located above the bottom of the box B. These cross-bars raise the milk-can above the bottom of the box, so as to permit of the free circulation of air around the sides of the can.

K is the bail or handle of the milk-can, and L a glass gage suitably marked to indicate pints and quarts or other quantities, as the case may be.

My device will prove of the greatest convenience to milkmen and their customers, as the milkman may deliver his morning milk at any hour that suits him best, without disturbing his customers. A ticket is placed in the ticket-receptacle inside the lid over night, and the milkman when calling in the morning removes the can and places therein the quantity of milk represented by the ticket. It is impossible for him to give short measure, as the gage in the side of the milk-can indicates to the customer at a glance whether or not he has received the proper quantity. If desired, the government stamp may be affixed to the gage.

From the construction described the can is perfectly ventilated and the milk kept cool and fresh. At the same time it is perfectly safe in a rain storm and no flies or insects can get at it, as they frequently do when an ordinary jug or can is used. The drainage-spout in the bottom of the convex bottom allows any spilled milk to drip out and makes it readily possible to rinse out the box at any time.

The cross-bars J might be dispensed with, but their use is preferable, as they hold the milk-can in such a position as to allow the air to pass up on each side of it.

In use my milk-delivery box will be fastened to the wall inside of the vestibule or under the steps of houses provided with a basement or to any other convenient part.

What I claim as my invention is—

1. In a device of the class specified the combination of the milk-can I; the box or case B; the lid C; ticket-receptacle D; the convex bottom F; and the gauze-covered drainage-spout E; one or more gauze-covered ventilator-holes H, being formed in the sides of the box or case, substantially as described and for the purpose specified.

2. In a device of the class described, a can or milk-receptacle, a milk-can contained therein having a gage thereon, said receptacle having convex bottom F, a gauze-covered drainage-spout secured thereto, and one or more gauze-covered ventilating-openings in the sides of the case, substantially as described.

Toronto, July 20, 1895.

HARRY CULLEN.

In presence of—
   FRED CLARKE,
   E. KATE PHILLIPS.